(12) United States Patent
Pereira et al.

(10) Patent No.: US 7,298,255 B1
(45) Date of Patent: *Nov. 20, 2007

(54) SENSORY SYSTEMS EMPLOYING NON-UNIFORMLY SPACED WAVEGUIDE SENSORS FOR DETERMINING ORIENTATION AND ROTATIONAL SPEED OF OBJECTS

(75) Inventors: Carlos M. Pereira, Tannersville, PA (US); Hai-Long Nguyen, Bethlehem, PA (US)

(73) Assignee: United States of America as represented by the Secretary of the Army, Washington, DC (US)

( * ) Notice: Subject to any disclaimer, the term of this patent is extended or adjusted under 35 U.S.C. 154(b) by 189 days.

This patent is subject to a terminal disclaimer.

(21) Appl. No.: 11/161,413

(22) Filed: Aug. 2, 2005

Related U.S. Application Data

(60) Provisional application No. 60/522,379, filed on Sep. 22, 2004.

(51) Int. Cl.
*H04Q 1/08* (2006.01)
*G01S 13/58* (2006.01)

(52) U.S. Cl. .................. 340/539.1; 340/552; 340/554; 340/435; 342/126; 342/146

(58) Field of Classification Search .................... None
See application file for complete search history.

(56) References Cited

U.S. PATENT DOCUMENTS

| | | | |
|---|---|---|---|
| 7,145,502 B2 * | 12/2006 | Uebo et al. | 342/131 |
| 7,193,556 B1 * | 3/2007 | Pereira et al. | 342/62 |
| 2006/0007001 A1 * | 1/2006 | Rastegar et al. | 340/552 |
| 2007/0001051 A1 * | 1/2007 | Rastegar et al. | 244/3.1 |

* cited by examiner

*Primary Examiner*—Julie Bichngoc Lieu
(74) *Attorney, Agent, or Firm*—John F. Moran

(57) ABSTRACT

A sensory system for determining the orientation of an object, wherein the sensory system includes a plurality of non-uniformly spaced waveguide sensors or array(s) of waveguide sensors. The non-uniformly spaced waveguide sensors are responsive to received radio frequency signals wherein the received power of the signals is dependent upon the orientation of the waveguide(s).

7 Claims, 7 Drawing Sheets

SENSORY SYSTEMS EMPLOYING NON-UNIFORMLY SPACED WAVEGUIDE SENSORS FOR DETERMINING ORIENTATION AND ROTATIONAL SPEED OF OBJECTS

CROSS REFERENCE TO RELATED APPLICATION

This application claims the benefit under 35 USC 119(e) of U.S. Provisional Patent Application No. 60/522,379 filed Sep. 22, 2004, the entire file wrapper contents of which provisional application are herein incorporated by reference as though set forth at length.

FEDERAL INTEREST STATEMENT

The inventions described herein may be manufactured, used and licensed by or for the U.S. Government for U.S. Government purposes without payment of any royalties thereon or therefore.

BACKGROUND OF INVENTION

1. Field of the Invention

This invention relates generally to the field of guidance systems for gun-fired munitions, missiles and high-speed flying objects. More particularly, it pertains to methods of integrating guidance control and navigation sensors that do not use signals from a Global Positioning System and do not use inertia components. Methods described herein, when appropriately integrated onto guided munitions, directly measure the angular orientation of the munition with reference to a specific point. Advantageously, the measurement is precisely performed in real-time and is free of measurement drift errors.

Importantly, the novel concepts described herein can be incorporated into a new class of sensors that can become an important component for guidance systems that do not require the Global Positioning System (GPS) and can be used for the precise tracking of a munition in-flight and homing into targets. Because this new class of sensors can be made in micro sized cavities, they enable the precise control of small caliber munitions, which is currently not possible with existing technologies. In addition to its applicability to munitions, this new class of sensors may improve control and maneuverability of robotic systems, automated machinery and other systems that employ angle and position measurement.

2. Background of the Invention

Precision-guided munitions are self-guiding weapons intended to precisely hit a target with minimum "collateral damage". Because the damage effects of an explosive weapon scale with distance, improvements in accuracy (and hence reduction in miss distance) enables a target to be effectively attacked with fewer and/or smaller munitions.

Precision sensors that determine position and orientation information are essential for closing the feedback guidance and control loop in all smart and guided projectiles such as munitions and missiles. Orientation measurement sensors are particularly essential in gun-fired munitions since they also provide the means to significantly reduce the guidance actuation authority and related power consumption levels, thereby minimizing the need to allocate a considerable amount of the munitions's volume to actuation mechanisms and their power sources.

Together with precision, future sensors for guidance need to provide information in real time, and exhibit very fast acquisition of position information for the round in flight. This is particularly true when discrete firing thrusters are used for tracking and/or course correction since, with such actuation mechanisms, only a limited number of corrective actions are available and they can be effectively used only if the full angular orientation of the munition is known at all times and is used to properly time thruster firing.

Consequently, improvements made to the guidance of precision-munitions is of particular importance.

Present day guidance systems typically use inertial or magnetometer-based systems as a means to sense orientation and position of an object in flight. A typical inertial navigation system uses a combination of accelerometers and solves a large set of differential equations to estimate position and attitude, when starting from a known initial position.

Current sensors for the measurement of the angular position of one object relative to another can be divided into the following three major categories. A first category of sensors measure changes in the angular position using inertial devices such as accelerometers and gyros. Inertial based angular position sensors, however, suffer from drift and noise error accumulation problems because the drift and the measurement errors are accumulated over time and the acceleration has to be integrated twice to determine the angular position. Consequently drift errors reach intolerable levels, particularly as a munitions's range is increased.

Another problem associated with inertia based angular position sensors is that the angular position of one object relative to another cannot be measured directly, i.e., the orientation of each object relative to the inertia frame has to be measured separately and used to determine their relative angular position. Since both measurements contain drift errors, the relative angular position measurement compounds the problem even more.

A second class of angular position sensors operate using optical methods. Unfortunately however, these optical, angular position sensors require a line of sight between two objects and have a limited range to perform the measurement. In general, optical angular position sensors and methods have a limited range of angular position measurement and require relatively high amount of power to operate. As a result, they are largely employed with ground equipment or stations, and seldom onboard of gun-fired munitions.

A third category of angular orientation measurement systems use radio frequency (RF) antennas printed or placed on the surface of an object to reflect RF energy emanating from a ground-based radar system. The reflected energy is then used to track the object on its way to a destination. With two moving objects, the radar measures the time difference between the return signals from each of the objects and thereby determines angular information in terms of the angle that the relative velocity vector makes with respect to a coordinate system fixed to one of the objects.

With such systems, measurement of full spatial orientation of an object (relative to the fixed radar or a second object) is very difficult. In addition, the information about the object orientation is determined at a radar station and has to be transmitted to the moving object(s) if it is to be used for course correction. In addition, it is also very difficult and costly to develop systems that could track multiple projectiles.

Finally, it is worth noting that in addition to the above angular orientation measurement systems, GPS signals have been used to provide angular orientation information. Such systems however, are prone to jamming and to the loss of signal, particularly in munitions applications.

The next generation of guidance control and navigation systems should therefore minimize any dependency on the Global Positioning System (GPS) or inertial technologies. They should also exhibit low cost. Such systems will undoubtedly find applicability to robotics and automation in addition to the precise targeting of munitions.

Fortunately however, alternative technologies are being developed which offer the promise of providing a type of angular position sensors suitable for the above-noted uses. In particular, C. Pereira, Q. J. Ge and J. Rastegar described such sensors in a paper entitled "On the Geometry of 3D Orientation Measurement Using a New Class of Wireless Angular Position Sensors", that appeared in the Proceedings of DETC'03, 2003 ASME Design Engineering Technical conferences and Computers and Information in Engineering Conferences which was held in Chicago, Ill. on Sep. 2-3, 2003.

In that paper, the authors therein described a new class of wireless angular position sensors that comprised waveguides that receive and record electromagnetic energy emitted by a polarized RF source. The angular position of the waveguide is indicated by the energy level. A system equipped with multiple waveguides is used as a 3D orientation sensor.

Given their potential for providing a significant advance in the art of munitions and other navigation systems, position sensors employing waveguides are of particular interest. Such position sensors are the subject of the present invention.

SUMMARY OF THE INVENTION

We have developed sensory systems employing non-uniformly spaced waveguides for determining the orientation and rotational speed of high-speed flying objects such as high-performance munitions.

According to our invention, at least three waveguide sensors are displaced within/on a projectile wherein the spacing between the waveguide sensors is not uniform.

When reference radio frequency signals are directed to the projectile, a varying received power of the signals is detected at respective waveguides depending upon the orientation of the waveguide at that instant. Since the waveguides are generally fixed to the projectile, the varying received signals provide a mechanism whereby the projectile orientation may be absolutely determined.

Viewed from a first aspect, our invention involves at least three non-uniformly spaced waveguides as position sensors. Viewed from another aspect, our invention involves arrays of such non-uniformly spaced waveguides as system(s) of position sensors. Finally, and viewed from yet another aspect, our invention involves varying shape(s) and geometries of these waveguide sensors, along with various dipole positions within the waveguide itself.

Overall, our invention is directed to sensing technologies that provide absolute, direct and real-time measurements of the position of an object relative to a reference point. The sensor technologies operate based on principles of electromagnetic propagation and the interaction of propagated polarized electromagnetic energy with waveguide cavities of special aperture geometries. Such waveguide geometries—when properly designed—can be made to achieve very high angular measurement capability and the sensor can be miniaturized by increasing the frequency of operation.

For robotics and automation applications, precise, our inventive, non-GPS positioning and full angular orientation results in sensory systems that provide information for navigation algorithms in real—time which is direct, absolute and free of accumulating drift errors.

For military precision munitions, our inventive non-GPS sensing technologies enables instantaneous guidance, control and navigation in real—time with very small positioning measurement latency and the navigation of the full range of military munitions, including small, medium and large caliber.

Inasmuch as current medium and small caliber munitions are generally not guided because GPS-inertia technologies are too large and too slow to serve as sensors, our inventive class of non-GPS non-inertia technologies will integrate in any size of platform and enable the guidance and control of small and medium caliber munition trajectories.

Consequently—and as a result of the deployment or our inventive position sensors—better precision of battlefield and other defensive munitions will reduce undesired damage in the battlefield and particularly in defending urban areas.

BRIEF DESCRIPTION OF THE DRAWINGS

Various features and advantages of the present invention and the manner of attaining them will be described in greater detail with reference to the following description, claims and drawing in which reference numerals are reused—where appropriate—to indicate a correspondence between the referenced items, and wherein:

DETAILED DESCRIPTION

Figure 1:
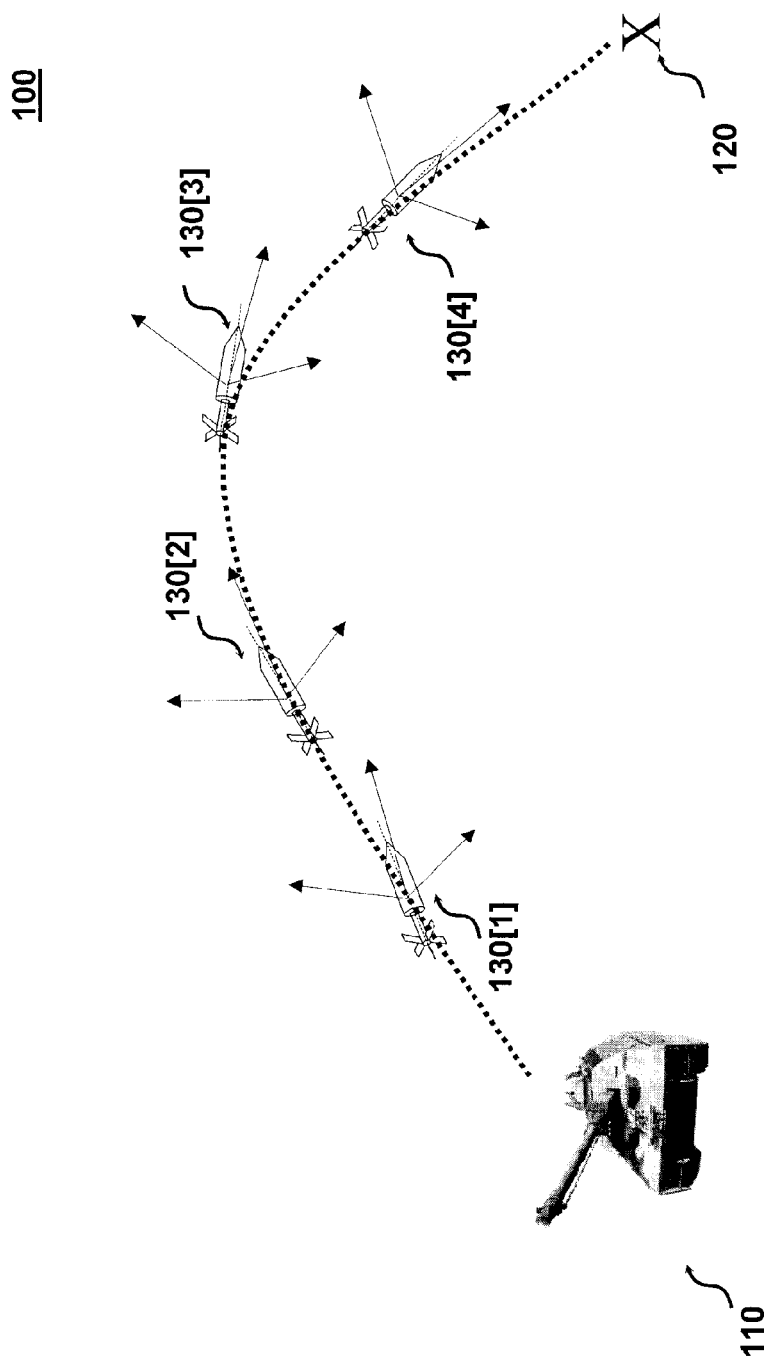
FIG. 1 is a schematic illustration of a munitions projectile in-flight.

FIG. 1 is a schematic illustration of a representative projectile in flight and which serves as a starting point for a discussion of the present invention. In particular, and with reference to that FIG. 1, a representative ballistic projectile is shown being shot from tank 110 at target 120 along a flight path 130.

As the projectile proceeds along its flight path 130 from the tank 110 to the target 120, any of a number of conditions may affect its flight and therefore its ability to be ballistically directed to the target 120. Consequently, if the projectile (or another system) was able to precisely and accurately determine the projectile orientation at any of a number of discrete points 130[1] . . . 130[N] along the flight path 130, then real time correction of its flight path becomes possible thereby producing a higher probability impacting target 120 while simultaneously realizing the additional benefit of minimizing any collateral damage. Advantageously, our inventive non-uniformly spaced waveguides provide the means for such orientation determination.

More specifically, our inventive method(s) and apparatus which are the subject of the instant application make use of reference radio frequency (RF) signals and arrays of waveguide cavities—non-uniformly spaced from one another—to determine the position and angular orientation of objects. Advantageously, these inventive method(s) and apparatus are highly sensitive to angular orientation, and therefore may provide precise orientation information.

By way of additional background information, a waveguide structure—with appropriate aperture—transforms electromagnetic propagation that resonates with the cavity size. In the case of the waveguide(s) considered for the angular orientation sensors, the geometry typically has a rectangular aperture and is terminated at a specific length and is filled with air that acts as a dielectric. Additionally, the waveguides have internal metallic walls so that the electric or magnetic fields are properly terminated and the boundary conditions are correct to support a TEmn mode.

In operation, electromagnetic energy enters the aperture and is confined to a finite region and in one direction. At frequencies where the wavelength approaches the cross-section of the aperture waveguide, electromagnetic energy propagates with little loss except for losses caused by the quality of the internal wall surfaces. Because of the frequency of the propagated signal, the fields that enter the waveguide are restricted in a manner such that they terminate at all of the four internal walls of the geometry. Internally, on the waveguide walls, the terminated fields distribute surface charges that vary at the same rate as the fields that produce them.

Importantly, an electromagnetic field can propagate along a waveguide in various ways. Two common modes are known as transverse-magnetic (TM) and transverse-electric (TE). In TM mode, the magnetic lines of flux are perpendicular to the axis of the waveguide. In TE mode, the electric lines of flux are perpendicular to the axis of the waveguide. Either mode can provide low loss and high efficiency as long as the interior of the waveguide is properly maintained.

The propagation of the field components inside a sectoral horn waveguide is time invariant and keeps its shape as it propagates inside the guide. At any given cross section, the fields vary in time producing loops of alternate polarity. This alternating flux induces currents in the walls of the guide. These currents are at right angles to the magnetic field and move along down the rectangular waveguide at a velocity which is identified as the phase velocity. A pickup dipole—situated inside the waveguide—transduces the effects of these distributed currents into a voltage which is proportional to the angular orientation of the sectoral horn waveguide with reference to the polarized illumination signal.

As can be readily appreciated, aperture shapes of waveguides may be a variety of shapes including rectangular, hollow cylindrical, and solid cylindrical, wherein the waveguide is constructed from a suitable dielectric material that guides microwave energy.

Figure 2:
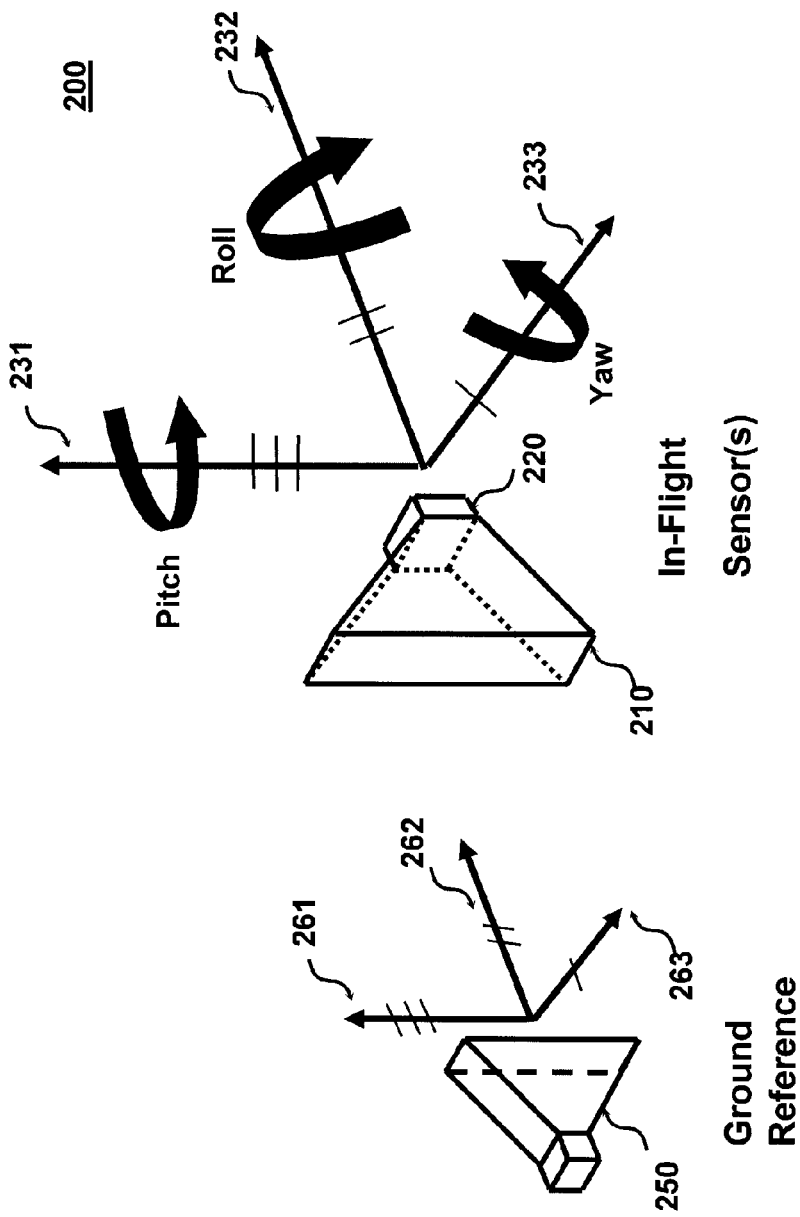
FIG. 2 is a schematic illustration of RF based waveguide sensor for angular position measurement according to the present invention showing both in-flight sensor(s) and reference(s)

With reference now to FIG. 2, there is shown a representative waveguide 220, matched with a horn antenna 210 (flared aperture) which as we shall show, will become the basis for our inventive sensor(s).

The waveguide 220, is shown in FIG. 2 as being rectangular in cross section, although there is nothing in our inventive teachings so limiting. Accordingly, our inventive sensors may be constructed from waveguides exhibiting any cross sectional shape, so long as the resulting waveguide exhibits a suitable sensitivity to angular orientation.

When electromagnetic energy (such as that which may be emitted from reference source 250) enters a waveguide such as that shown for an in-flight sensor 220, induced currents in the walls of the waveguide result in an overall power loss. This loss of power is due, primarily, to a skin effect and any abrupt geometrical transitions within the waveguide, such as sharp corners or a reduction in cross section. To minimize such power loss, oftentimes the internal walls of a waveguide are coated with special materials, which reduce the skin effect and the resistance to the propagation of the electromagnetic wave.

The power loss due to the skin effect inside the waveguide walls, the finish of the metallic surface and the transitions inside the waveguide geometry only account for a small loss of the power received by the geometry aperture. The primary reason for the power received by a waveguide geometry is the projection of the waveguide geometry relative to the incident electromagnetic field.

As an example, for a waveguide geometry propagating a TE mode, the received power varies in the pitch direction by an amount obtained by multiplying the total incident power by the cosine of the angle that the receiving waveguide was rotated in the pitch direction (direction of the magnetic field for TE mode). Similarly, the variation of the received power at the aperture in the yaw direction (direction of the electric field for TE mode) is obtained by multiplying the total incident power by the sine of the angle that the receiving waveguide was rotated in the yaw direction.

Aperture antennas, are commonly used in aircraft or spacecraft applications and are flared or otherwise tapered to form a larger opening thereby improving antenna efficiency. Such aperture antennas are known as flared apertures or horn antennas, and find wide applicability in radio astronomy, satellite tracking and line-of-site communications systems. Importantly for our purposes, horn antennas such as 210 in FIG. 2, are quite useful in the microwave region of the electromagnetic spectrum because they offer high gain and low voltage standing wave ration (VSWR).

As the electromagnetic energy (not specifically shown) enters the aperture of horn antenna 210, it is generally confined to a finite region and in one direction. At frequencies where the wavelength of the electromagnetic energy approaches the cross-section of the waveguide, the electromagnetic energy propagates with little loss except for those losses caused by internal wall surfaces. The fields that enter the waveguide 220, induce current(s) in the walls of the waveguide.

Two boundary conditions are generally required to describe the mode of propagation of the electromagnetic wave along the waveguide 220, namely: 1) that electric fields must terminate normally on a metallic surface and tangential components of the electric field must be zero and 2) magnetic fields must occur entirely along the metallic wall surface.

While not specifically shown, the magnetic field(s) is at a right angle to the direction of propagation of the electromagnetic wave within the waveguide 220, and terminates normally to the sidewalls.

As the magnetic field propagates down the waveguide, it induces currents in the walls of the waveguide. A dipole 230, is introduced in the path of the current, thereby resulting in a very small voltage induced into the dipole 230.

Advantageously, the amplitude of the voltage varies as a function of the electromagnetic energy that enters the waveguide 220. Accordingly, as an electromagnetic wave enters the closed cavity waveguide, it produces a varying induced current in the dipole 230, which is related to the angular orientation of the closed waveguide cavity relative to the direction of the propagated wave. As such, the amplitude of the voltage induced in the dipole 230, is proportional to an angle of orientation of the closed waveguide along three axis 231, 232, 233, which may define the pitch, roll, and yaw of the waveguide 220 and as we shall soon see, the orientation of a projectile or other in-flight object employing such waveguide sensor(s).

Figure 3:
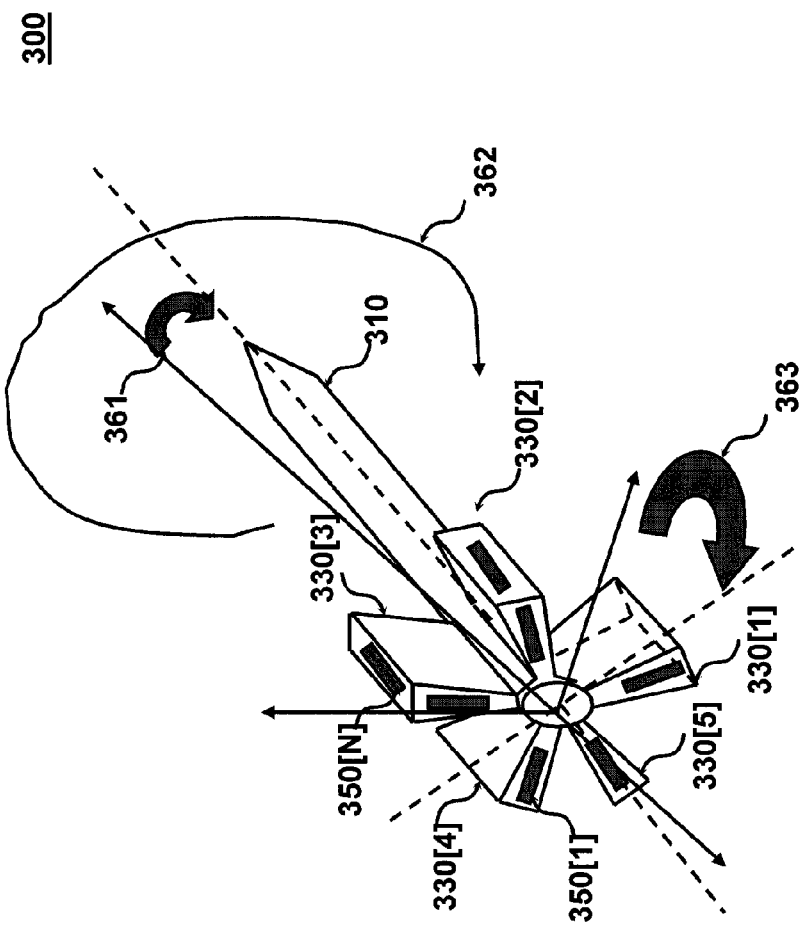
FIG. 3 is a schematic illustration of a projectile including a number of RF based waveguide sensor(s)

With reference now to FIG. 3, there is shown a representative in-flight projectile 310. As can be appreciated, angular displacement of the projectile 310 may be measured over three axis, depicted by pitch, rotation and yaw arrows 361362 and 363. As shown with this representative projectile—and is common in many such projectiles—aerodynamic fins 330[1] . . . 330[5] are disposed around perimeter of projectile 310 so as to improve its aerodynamic stability and/or other characteristics.

Shown further in this FIG. 3, are a plurality of waveguide sensor(s) 350[1] . . . 350[N], which are shown co-located with the aerodynamic fins 330[1] . . . 330[5]. It is important to note that such placement is only shown for convenience, there is no such requirement that any or all of the waveguide sensor(s) be so located with the fins. Instead, they could be positioned within or along a nose portion, body portion or tail portion of the projectile 310, depending upon the characteristics desired.

In addition, there is no fixed limit to the number of such waveguide sensors that may be placed within or on a projectile, such as 310, however we have determined that a preferred embodiment will include at least three (3) waveguide sensors.

In addition, and while not specifically shown in the figure, the waveguide sensors 350[1] . . . 350[N], are not necessarily individual waveguides, but instead may be an array of sensors, each array having the same or different geometry(ies) and or number of individual waveguide(s).

Figure 4:
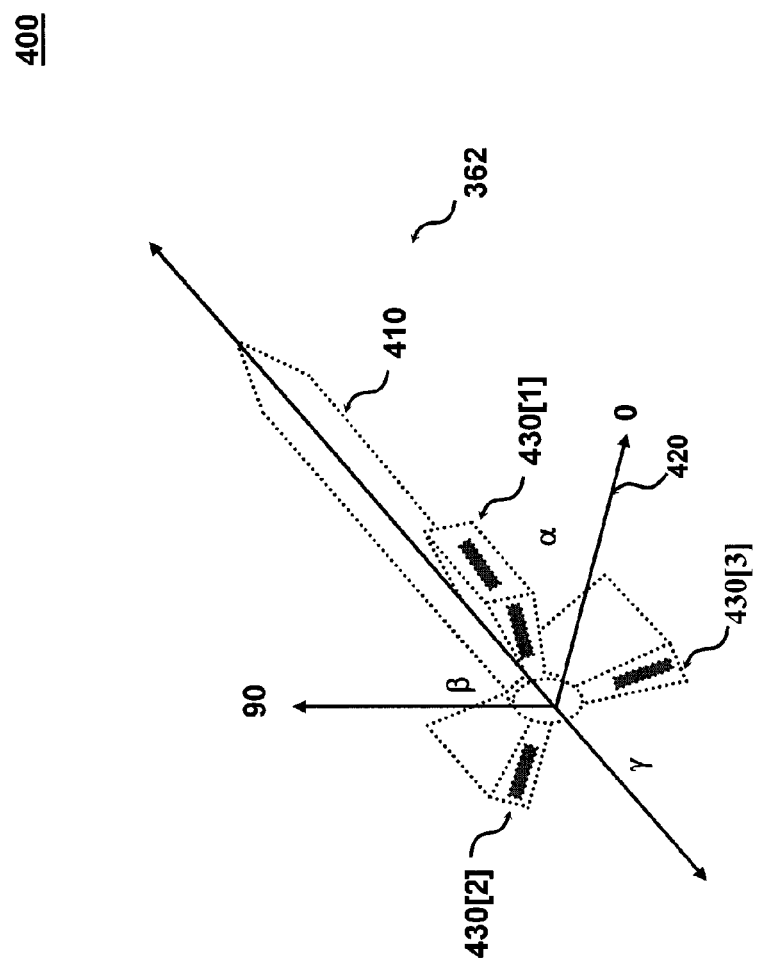
FIG. 4 is a schematic illustration of a projectile including a number of RF based waveguide sensors depicting their non-uniform spacing according to the present invention.

Turning now to FIG. 4, there is shown a schematic of a representative projectile 410, positioned along arbitrary axis, 415, which for convenience of this discussion is positioned in axial alignment with the projectile 410. As with the projectile depicted earlier, a number of waveguide sensors 430[1] . . . 430[3]—which in a preferred embodiment include at least three in number—are disposed radially about the projectile 410.

Importantly—and according to the specific teachings of the present invention, the waveguide sensors 430[1] . . . 430[3] are spaced non-uniformly. That is, the distance between any two waveguides is not the same as that between any other two waveguides.

We can begin to understand this non-uniform spaced relationship with continued reference to FIG. 4. In particular, we have depicted in that FIG. 4 an arbitrary reference axis 420, which is perpendicular to the axial axis 415. If we refer to an individual waveguide sensor 430[1] . . . 430[3] as having a unique radial offset from that reference axis 420, then waveguide sensor 430[1] is offset from reference axis 420 by α; waveguide sensor 430[2] is offset from reference axis 420 by β; and waveguide sensor 430[3] is offset from reference axis 420 by γ.

As noted before, the spacing between any two of the waveguide sensors used for a particular measurement will not be the same. Accordingly, and with continued reference to FIG. 4, the radial offset between waveguide sensor 430[1] and waveguide sensor 430[2] (β−α) is not equal to the radial offset between waveguide sensor 430[2] and waveguide sensor 430[3] (γ−β); and the radial offset between waveguide sensor 430[1] waveguide sensor 430[3] (γ−α). Stated briefly, and when viewed along a common reference axis, the radial offset between any two waveguide sensors is not equal to the radial offset between any two other waveguide sensors used for a particular position and/or orientation measurement.

Figure 5:
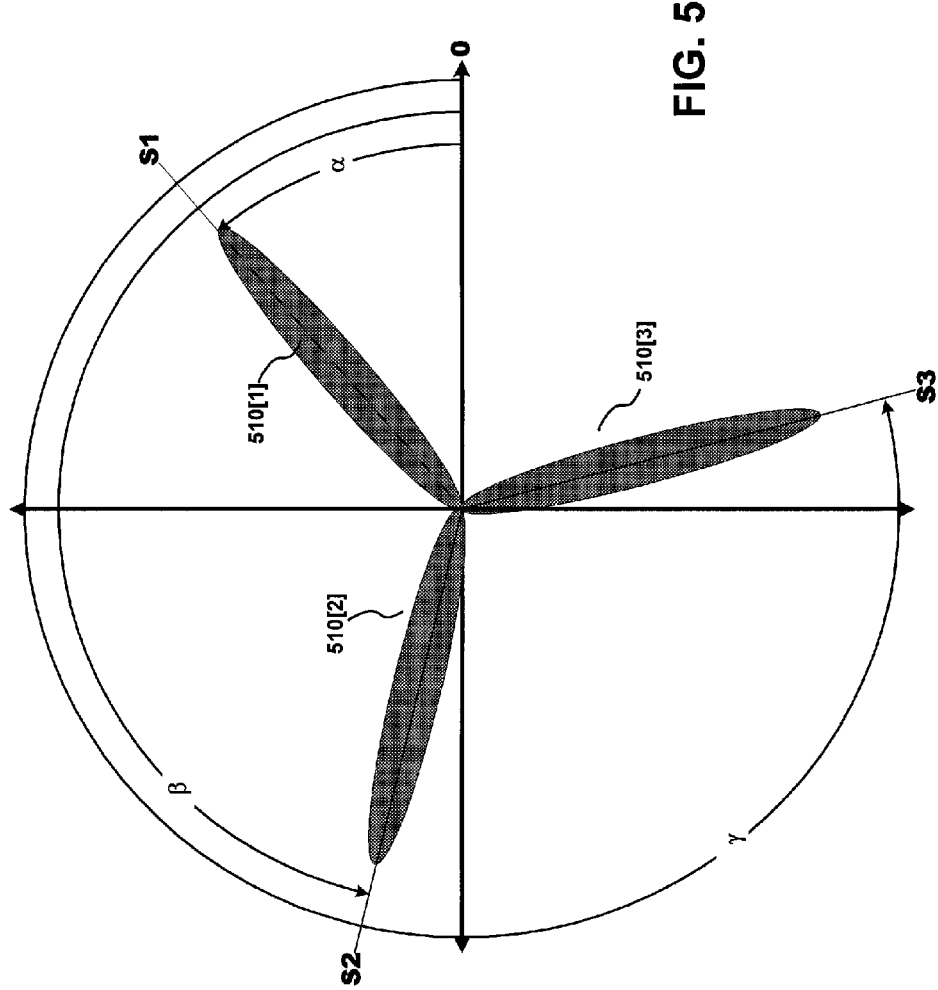
FIG. 5 is an illustration of a number of RF based waveguide sensors depicting their non-uniform spacing about an arbitrary axis.

FIG. 5 depicts a number of waveguides disposed radially about an axis showing their non-uniform spacing. In particular, shown in that FIG. 5 are three waveguide sensors 510[1] . . . 510[3] radially positioned about an axis. As can be seen from that FIG. 5, a first waveguide sensor 510[1] is offset α from the origin of axis, a second waveguide sensor 510[2] is offset β from that origin and a third waveguide sensor 510[3] is offset γ from that origin. As noted before, none of the offsets are equal to one another and none of the offsets between any two of the waveguide sensors is equal to an offset between any other two waveguide sensors. As such, the waveguides are non-uniformly spaced from one another.

Figure 6:
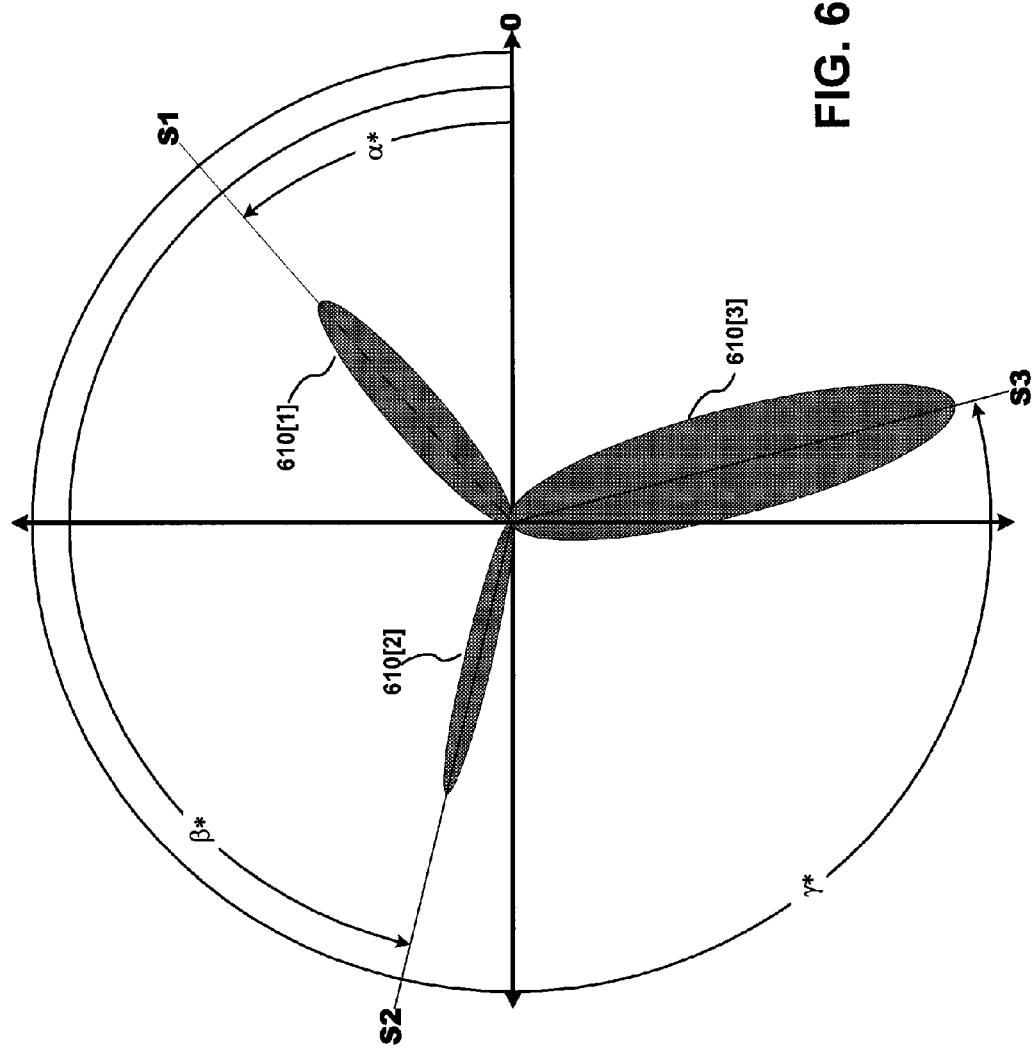
FIG. 6 is an illustration of a number of RF based waveguide sensors depicting their non-uniform spacing about an arbitrary axis producing power discrepancies among the sensors for a given reference signal.

Turning now to FIG. 6, we see that when the waveguide sensors 610[1] . . . 610[3] are moved about the origin such that their offsets are now depicted as α*, β* and β*, respectively, we see that the power (depicted by the shaded area) varies for each of the waveguide sensors, which corresponds to the received signal strength which, in turn, is a function of the orientation of the sensor to the reference signal. Accordingly, and as can be readily appreciated by those skilled in the art, the variation in power associated with a particular set of sensor(s), may be used to determine the set of sensors changing orientation. Since the sensors are "fixed" in position relative to one another within/withon a projectile, the orientation of that projectile is therefore determinable.

Figure 7:
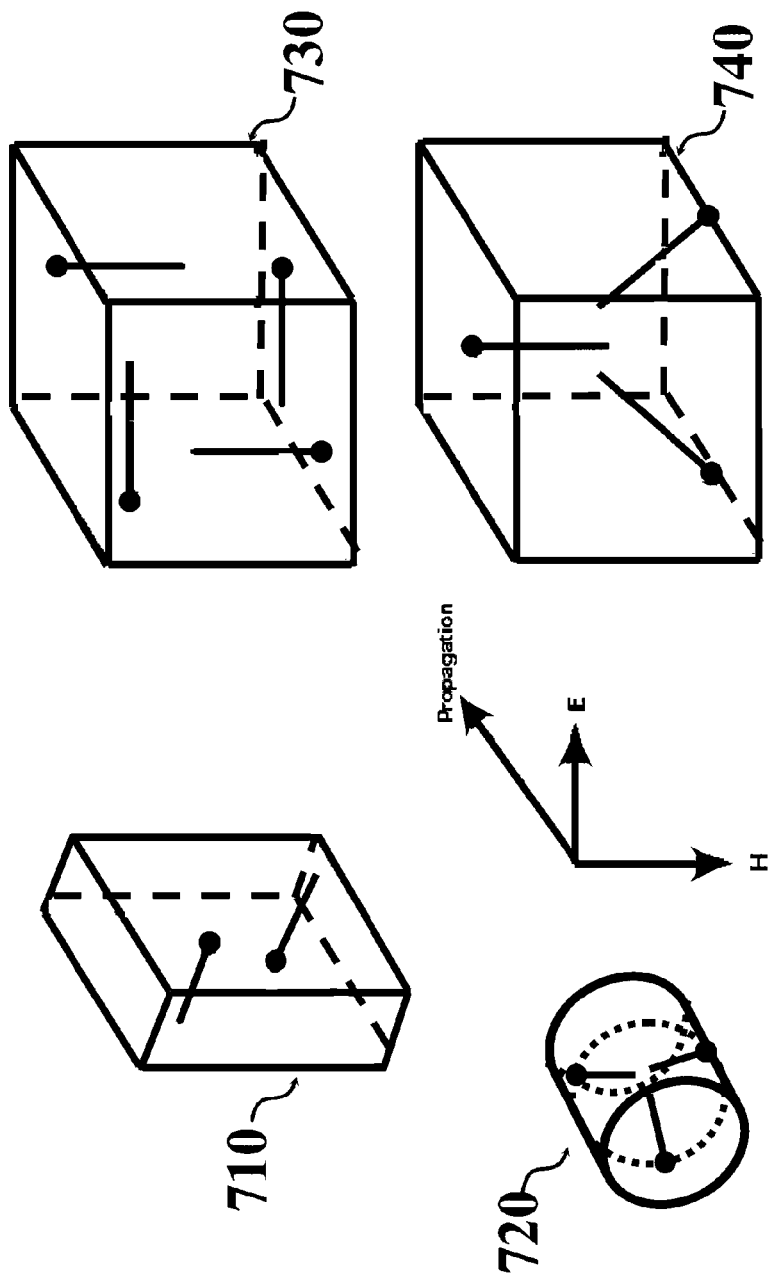
FIG. 7 is a schematic illustration of a number RF based waveguide(s) showing alternative dipole location(s) and respective geometries within the waveguide.

Finally, we now note that our invention is not limited to the simple waveguide geometries and waveguide orientation indicated prior. In particular, and with reference now to FIG. 7, there is shown a number of possible dipole orientation(s) and waveguide geometries. In particular, orientation 710 depicts a simple rectangular geometry with rectangular dipole orientation. Orientation 720 depicts a cylindrical geometry, with radial dipole placement. Orientation 730 is of a square geometry, with square dipole placement. Finally, orientation 740 is that of a square geometry, with radial dipole placement. As can be appreciated, the various combinations between waveguide shapes and dipole arrangement/placement, are quite flexible, and can be adjusted to maximize the orientation sensitivity for a particular projectile.

Finally, and while not specifically noted prior, the frequency range(s) for which the electromagnetic propagated wave in its interaction with the waveguide geometries is substantially within the range of 10 GHz and 100 GHz.

Of course, it will be understood by those skilled in the art that the foregoing is merely illustrative of the principles of this invention, and that various modifications can be made by those skilled in the art without departing from the scope and spirit of the invention. In particular, different sensor(s) and or master processor system combinations are envisioned. Additionally, alternative extraction/compression schemes will be developed, in addition to those already known and well understood. Accordingly, my invention is to be limited only by the scope of the claims attached hereto.

What is claimed is:

1. A sensory system for determining the orientation of an object, said sensory system comprising:
   a plurality of waveguide sensors fixed in position relative to the object, said plurality of waveguide sensors being responsive to received radio frequency signals such that the power of the received signal(s) varies with orientation of the waveguide sensors;

CHARACTERIZED IN THAT:
   the said waveguide sensors are non-uniformly spaced from one another; and
   the waveguide sensors include:
      an aperture, for receiving the radio frequency signals, said aperture being formed at an entrance to a waveguide;
      the waveguide appropriately terminated and opened at the aperture thereby forming a waveguide cavity, said waveguide for receiving electromagnetic energy being propagated from a reference point, wherein electromagnetic energy that enters the waveguide through the aperture is terminated at walls of the waveguide cavity thereby distributing a surface charge density on internal walls of the waveguide; and
      one or more dipoles, appropriately positioned within the waveguide such that a small signal detected will vary in magnitude with the quantity of electromagnetic energy entering the aperture.

2. The sensory system according to claim 1, wherein said waveguide sensors include a plurality of individual waveguides.

3. The sensory system according to claim 2, wherein one or more of the waveguides is substantially rectangular in shape.

4. The sensory system according to claim 3, wherein one or more of the waveguides is substantially cylindrical in shape.

5. The sensory system according to claim 4, wherein one or more of the waveguides is substantially cubic in shape.

6. The sensory system according to claim 1, wherein the radio frequency signals are substantially between 10 GHz and 100 GHz in frequency.

7. The sensory system according to claim 1, wherein the number of waveguide sensors employed is at least three.

* * * * *